United States Patent
Mellor et al.

(10) Patent No.: US 7,466,990 B2
(45) Date of Patent: Dec. 16, 2008

(54) INTELLIGENT MULTIPLEXERS IN AN ANTENNA LINE MANAGEMENT SYSTEM

(75) Inventors: Simon Mellor, London (GB); Stephen Newbold, High Wycombe (GB); Andrew Cope, Mixbury (GB)

(73) Assignee: Powerwave Technologies, Inc., Santa Ana, CA (US)

( * ) Notice: Subject to any disclaimer, the term of this patent is extended or adjusted under 35 U.S.C. 154(b) by 227 days.

(21) Appl. No.: 10/085,340

(22) Filed: Feb. 27, 2002

(65) Prior Publication Data

US 2002/0132644 A1    Sep. 19, 2002

Related U.S. Application Data

(60) Provisional application No. 60/277,120, filed on Mar. 19, 2001.

(51) Int. Cl.
*H04B 7/00* (2006.01)
*H04Q 7/20* (2006.01)
*H04B 1/38* (2006.01)
*H04B 3/36* (2006.01)
*H04M 1/00* (2006.01)

(52) U.S. Cl. .................. 455/523; 455/561; 455/14

(58) Field of Classification Search .............. 455/561, 455/562, 523, 422, 14, 522, 271, 137, 273; 379/326, 413.03
See application file for complete search history.

(56) References Cited

U.S. PATENT DOCUMENTS

| | | | |
|---|---|---|---|
| 5,421,030 A * | 5/1995 | Baran | 725/106 |
| 6,047,199 A | 4/2000 | DeMarco | 455/572 |
| 6,298,243 B1 * | 10/2001 | Basile | 455/552.1 |
| 6,594,508 B1 * | 7/2003 | Ketonen | 455/561 |

OTHER PUBLICATIONS

Peter A. Rizzi, Microwave Engineering, Passive Circuits, 1988, pp. 501-506, Prentice-Hall., New Jersey.
Herbert L. Krauss et al., Solid State Radio Engineering, 1980, pp. 2-3, 221, John Wiley & Sons, Inc.

* cited by examiner

*Primary Examiner*—Matthew D Anderson
*Assistant Examiner*—Eugene Yun
(74) *Attorney, Agent, or Firm*—Myers Dawes Andras & Sherman LLP

(57) ABSTRACT

A method and apparatus of transmitting a communication signal between a radio base station and a radiation element. In one embodiment, the method includes receiving an input signal. Then extracting a data signal from the input signal, the data signal includes values representing operating parameters of devices at the radiation element. And producing a status signal for each device that simulates a feedback signal for the device.

9 Claims, 5 Drawing Sheets

INTELLIGENT MULTIPLEXERS IN AN ANTENNA LINE MANAGEMENT SYSTEM

REFERENCE TO PRIORITY DOCUMENT

This Application claims priority to pending U.S. Provisional Application Ser. No. 60/277,120 filed Mar. 19, 2001, entitled "INTELLIGENT MULTIPLEXERS IN AN ANTENNA LINE MANAGEMENT SYSTEM" by Simon J. M. Mellor, Andrew Cope, and Stephen Newbold, which is incorporated by reference in its entirety herein.

BACKGROUND OF THE INVENTION

1. Field of the Invention

This invention relates to communication systems, more particularly, to transmission of communication signals between a base station and a radiation element.

2. Description of the Related Art

A communication system typically includes multiple devices, such as equipment and cables, that may be located remote to each other. For example, FIG. 1 illustrates an example of a conventional communication system. A radio base station 102 may receive, and transmit, a plurality of communication signals for many different sources. For example, the radio base station 102 in FIG. 1 may send and receive signals over conventional telephone lines 104, a satellite communication system 106, or using radio frequency (RF) microwave transmission 108. For RF transmission the base station 102 is also in communication with a radiation element 120. The base station sends and receives communication signals via the radiation element 120, which includes an antenna 122 and may also include support electronics 124. Communication signals between the radio base station 102 and the radiation element 120 are generally carried over a coaxial feeder cable 130. Radiation element 120 transmits communication signals from the radio base station to individual clients, as well as receives communication signals from the individual clients and transfers the received signals to the radio base station. Examples of clients, shown in FIG. 1, include mobile wireless handsets such as cell phones 140, mobile laptop computers or PDA 142, and fixed wireless devices such as meter reading equipment 144.

In conventional communication systems each communication channel of the radio base station 102 communicates with a single radiation element 120 device, such as the antenna 122 or the support electronics 124. If a radio base station has multiple communication channels in communication with multiple radiation elements, then there is a separate cable from each communication channel to each radiation element.

FIG. 2 is a block diagram illustrating additional detail of the connection between a radio base station 102 with multiple communication channels and multiple radiation elements 120. As shown in FIG. 2, the base station 102 has six (6) radio frequency (RF) communication channels that are communicated to six (6) radiation elements 120. FIG. 2 illustrates a system that includes an antenna 122 and support electronics at each radiation element 120. To transfer communication signals between the radio base station 102 and the radiation elements 120, six (6) feeder cables 130 connect each of the six (6) communication channels to its individual support electronics 124.

The base station also includes six (6) bias tees 202. The bias tees are used to combine a monitoring signal with the RF communication signal for transmission to the radiation element 120. Typically, the monitoring signal is used to indicate the operational state of a device connected to the feeder 130.

The operational state of a device in a conventional communication system is usually monitored by monitoring the current drawn by the device.

For example, in a communication system that has support electronics 124 that include a Mast Head Amplifier (MHA), the MHA draws a specified current when operating in a "normal" mode, for example, 100 mA at 12 VDC. The 100 mA current is supplied by a power supply located in the radio base station and is combined with the RF communication signal in a bias tee 202 at the radio base station. If there is an internal problem with the MHA, for example, a field effect transistor (FET) in the MHA is operating outside normal parameters, the current drawn by the MHA will change to a different value, for example, 150 mA. The change in current drawn by the MHA is as an indication that the MHA has something wrong with it. The change in current drawn by the MHA is detected by the radio base station power supply and an alarm is initiated, signaling that a fault has occurred.

There are several drawbacks to the current monitoring technique for fault detection described above. One of the drawbacks is that only a single device at the radiation element may be attached to the feeder cable 130. If more than one device were connected to the feeder 130 it would not be possible to isolate which device is operating outside its normal operating parameters as indicated by a change in current draw. For example, if there were two MHA devices connected to a single feeder and both drew 100 mA during normal operation, the total current drawn from the radio base station power supply during normal operation would be 200 mA. If one of the MHA had a fault and changed its current draw to 150 mA, the total current drawn from the radio base station power supply would be 250 mA. Thus, it could be determined that one of the MHAs had a fault, but it would not be possible to know which MHA had a fault.

Another drawback to the current monitoring fault detection technique is that it can result in false alarms. For example, if there is a fault in the feeder cable 130, such as a break in the cable and there is no current draw, the radio base station power supply will detect that there is a problem. Thus, it could be determined that there is a problem, but it would not be possible to isolate the fault to one particular element.

To get around the problem described above, conventional communication systems only place one device, such as a MHA, on a feeder cable 130. Using a separate feeder cable 130 for each device solves the problem of isolating the device that has a fault. However, using separate feeders for each device requires additional feeder cables 130 be installed whenever a new device is installed at the radiation element 120.

From the discussion above, it should be apparent that there is a need for a system that can provide for multiple devices to be connected to a feeder cable from a radio base station to a radiation element while allowing detection and isolation of faults within the devices. The present invention fulfills this, and other needs.

SUMMARY OF THE INVENTION

In accordance with the invention, a method and apparatus of transmitting a communication signal between a radio base station and a radiation element, including receiving an input signal, then extracting a data signal from the input signal, wherein the data signal includes values representing operating parameters of devices at the radiation element, and producing a status signal for each device that simulates a feedback signal for the device.

In another embodiment, a method of transmitting a communication signal between a radio base station and a radiation element includes receiving an input signal, then extracting a data signal from the input signal that includes values representing operating parameter settings for devices at the radiation element, and producing an output signal for each device that transfers the operating parameter setting to the device.

In one embodiment an apparatus for transmitting a communication signal between a radio base station and a radiation element includes a bias tee configured to receive an input signal, a controller configured to extract a data signal from the input signal that includes values representing operating parameters of devices at the radiation element and to produce a status signal for each device, and a load simulator the simulates a feedback signal for the device.

In another embodiment, an apparatus for transmitting a communication signal between a radio base station and a radiation element includes a receiver configured to receive a plurality of communication signals, a combiner configured to combine the plurality of communication signals with a data signal, and a transmitter configured to transmit the combined plurality of communication signals and the data signal.

In another embodiment, an apparatus for transmitting a communication signal between a radio base station and a radiation element includes a bias tee configured to receive an input signal, and a controller configured to extract a data signal from the input signal that includes values representing operating parameter settings for devices at the radiation element and to produce an output signal for each device that transfers the operating parameter setting to the device.

In another embodiment, an apparatus for transmitting a communication signal between a radio base station and a radiation element includes a receiver configured to receive a plurality of communication signals, a controller configured to produce a data signal comprising values representing operating parameters for a plurality of devices at the radiation element, a combiner configured to combine the plurality of communication signals with the data signal, and a transmitter configured to transmit the combined plurality of communication signals and the data signal.

Other features and advantages of the present invention should be apparent from the following description of the preferred embodiment, which illustrates, by way of example, principles of the invention.

DETAILED DESCRIPTION

Consumer demand for improved communications systems, in particular wireless communication systems, is continuing to expand. Currently, wireless communication systems are based on second generation wireless technologies, such as, global systems for mobile communications (GSM) standards 900 and 1800, as well as code division multiple access (CDMA) standards IS-95. Recent developments in wireless communication technologies have lead to the development of third generation (3G) standards, such as, universal mobile telecommunication system (UMTS) and wideband CDMA (WCDMA). Communication systems based on these 3G interfaces will provide improved, broadband, communications to consumers.

3G communications systems, such as, communication systems based on a UMTS infrastructure will require a more dense distribution of base station sites. To decrease the cost of deploying a 3G system, it is expected that existing infrastructure will be used when possible. Using the existing infrastructure will result in 3G equipment, such as UMTS devices, being co-located with existing 2G equipment, such as GSM900 and GSM1800 devices.

Conventionally, the installation of additional equipment at the radiation element of a communication system requires installing additional feeder cables. Adding additional feeder cables increases the cost and complexity of the installation. Use of intelligent multiplexers, in accordance with the invention, may eliminate the need to install additional feeder cables.

Figure 1:
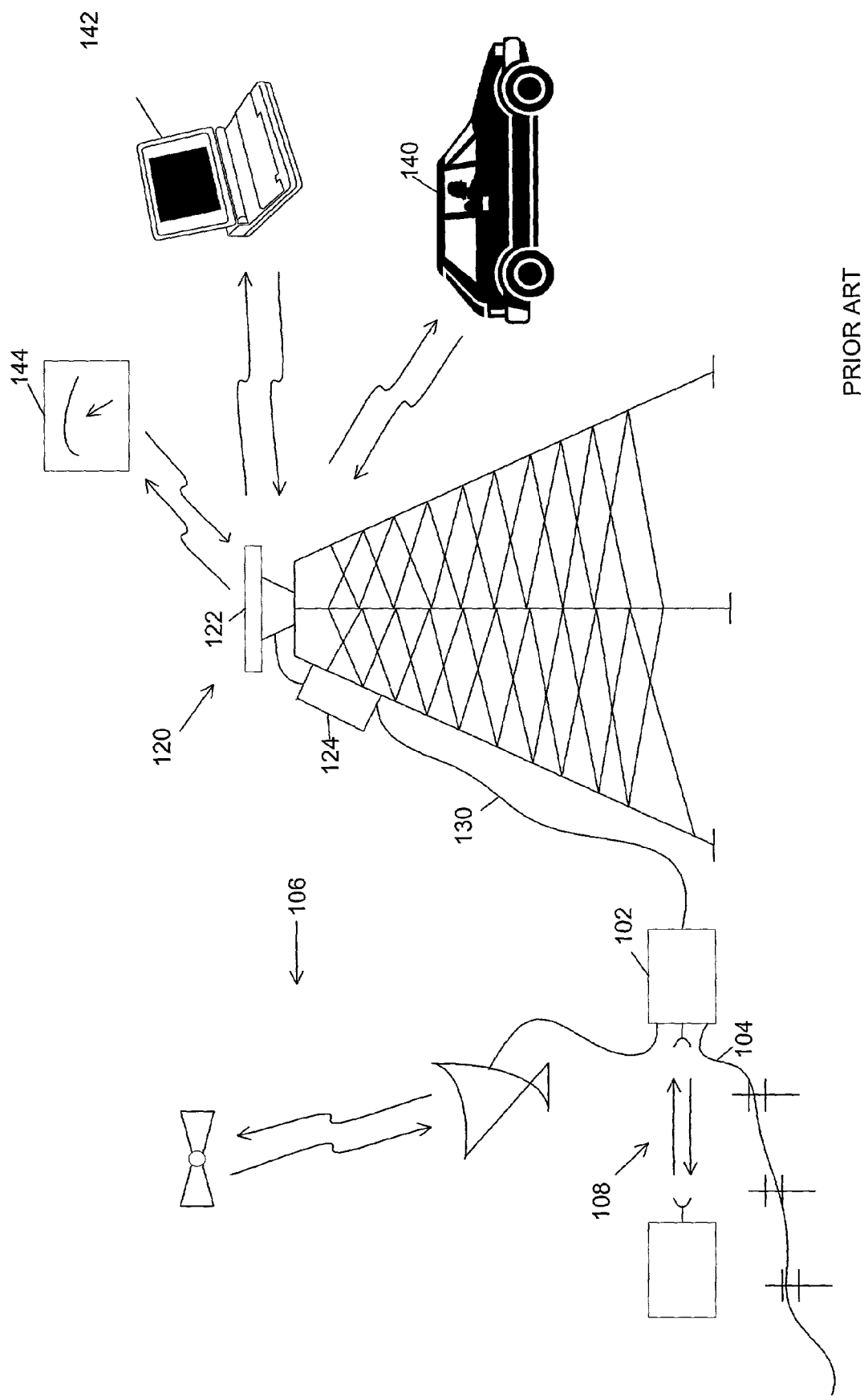
FIG. 1 illustrates an example of a conventional communication system.
Figure 2:
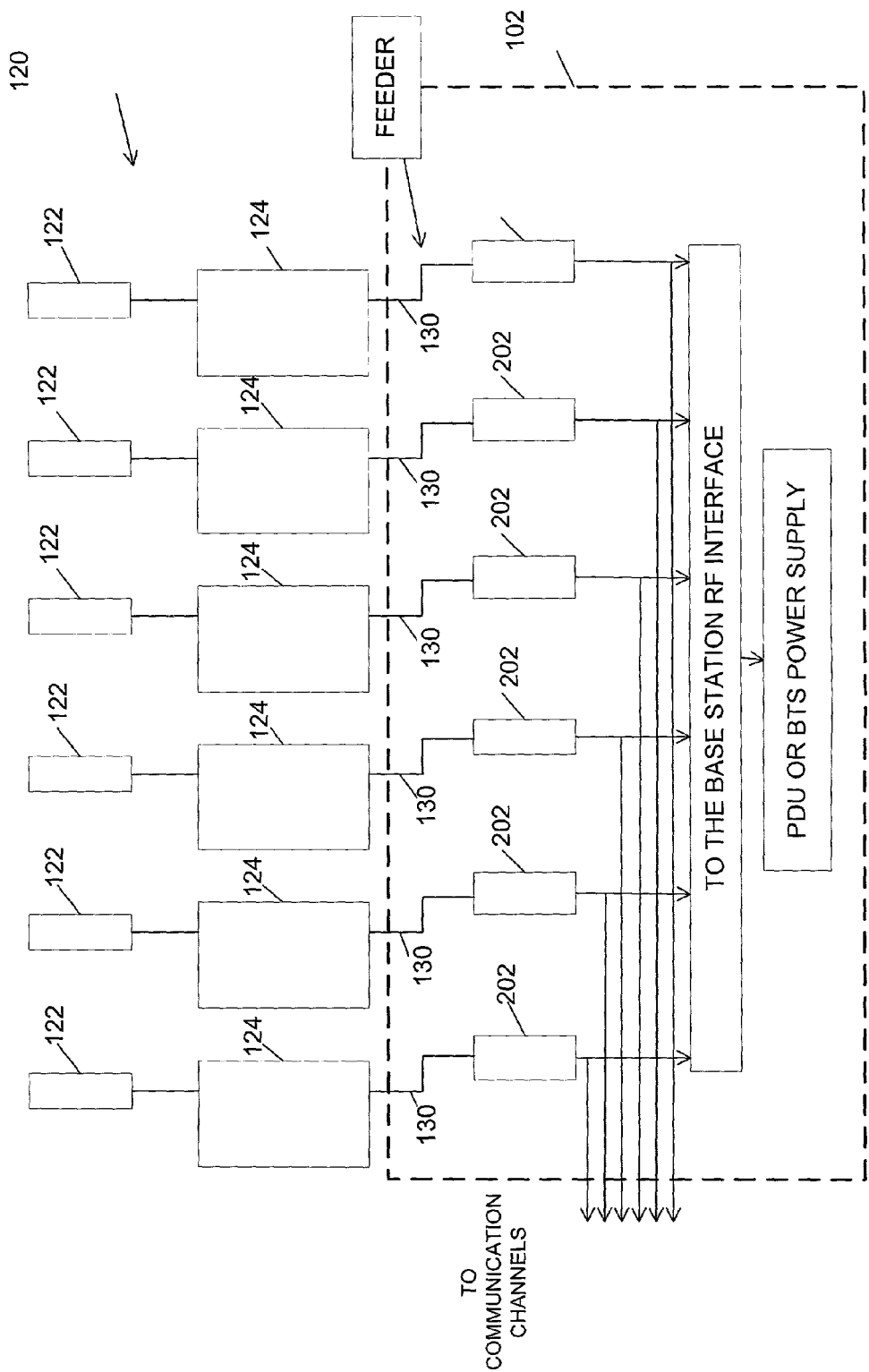
FIG. 2 is a block diagram illustrating additional detail of FIG. 1, showing the connection between a radio base station and multiple radiation elements.
Figure 3:
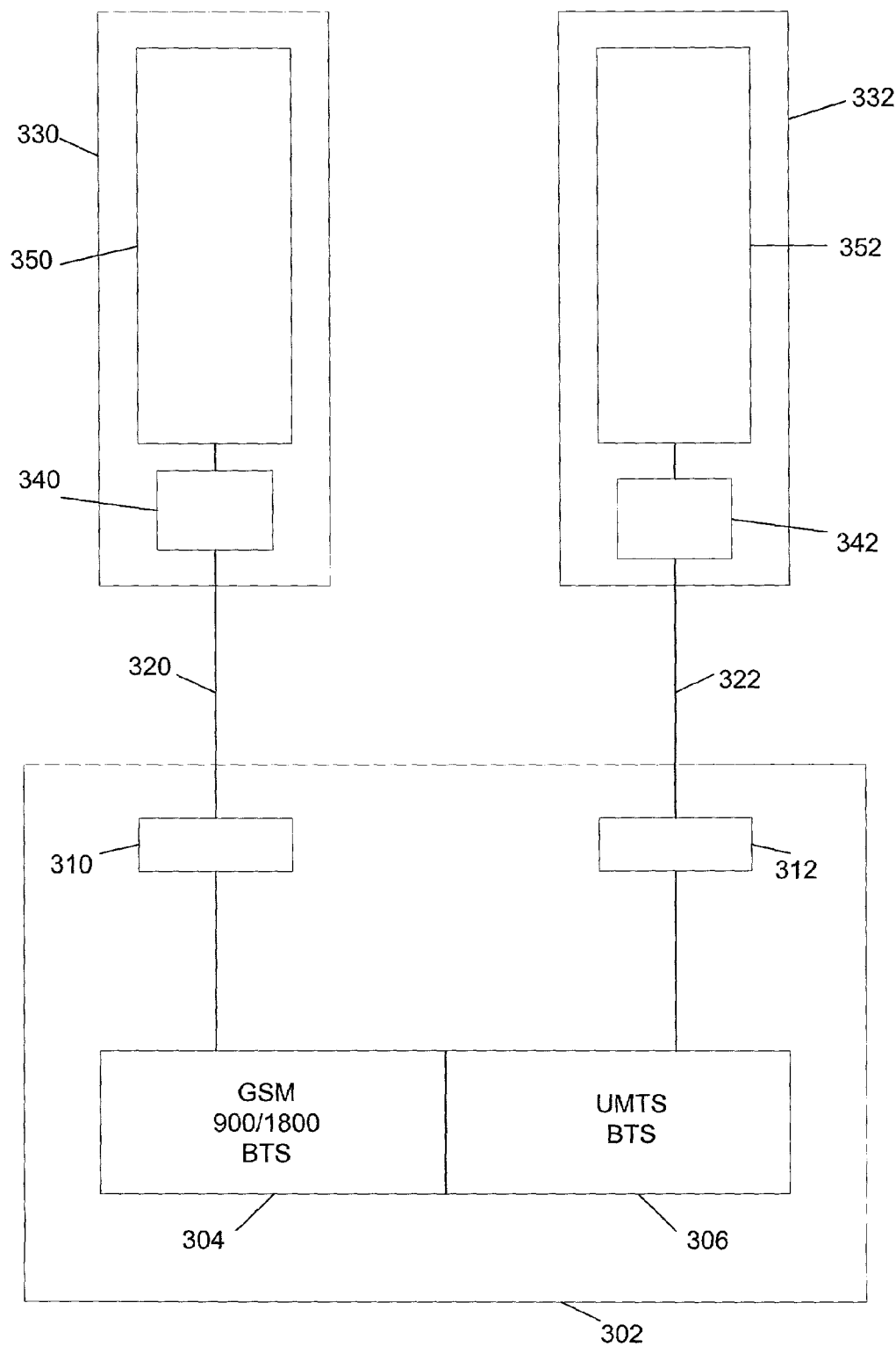
FIG. 3 is a block diagram of a conventional multi-feeder communication system.

FIG. 3 is a block diagram of a conventional multi-feeder communication system. In FIG. 3 a radio base station 302 includes a first communication channel 304 and a second communication channel 306. The communication channels may be either 2G, 3G, or any other type of communication channel. In the example shown in FIG. 3 the first communication channel 304 is a 2G channel and the second communication channel 306 is a 3G channel.

The outputs of communication channels 304 and 306 are connected to bias tees 310 and 312 respectively. The bias tees 310 and 312 provide a way to monitor the operational state of a device in the system. The output of the bias tees 310 and 312 are connected to feeder cables 320 and 322 respectively. The feeder cables 320 and 322 are connected to radiation elements 330 and 332 respectively. The radiation elements may include support electronics 340 and 342, and antennas 350 and 352 respectively.

In the example shown in FIG. 3, the operational state of support electronics 340 and 342 may be monitored by connecting power supplies to the bias tees 310 and 312. The power supplies may provide current to the support electronics 340 and 342 via the tees 310 and 312. The amount of current drawn from each of the power supplies may indicate the operational state of the support electronics 340 and 342.

Figure 4:
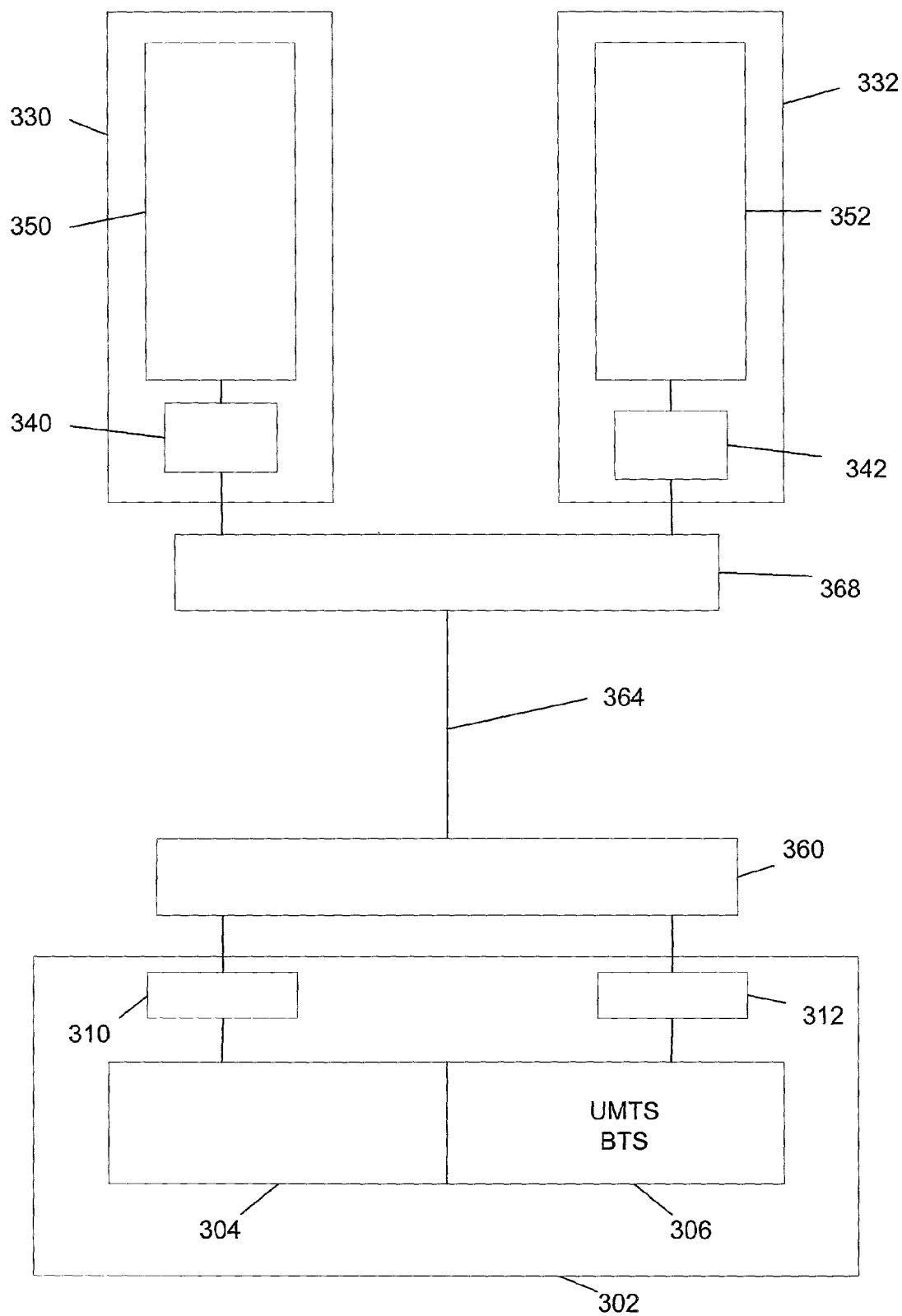
FIG. 4 is a block diagram of an embodiment of a communication system using intelligent multiplexers in accordance with the invention.

FIG. 4 is a block diagram of an embodiment of a communication system using intelligent multiplexers in accordance with the invention. An aspect of the invention is that multiple communication channels, with monitoring signals, can share a common feeder cable. For example, in an existing system that uses current monitoring, as described above, each communication channel has its own dedicated feeder cable.

Using intelligent multiplexers, in accordance with the invention, the communication channels can share a common feeder cable. One technique used to share a common feeder cable is to monitor the current drawn, or other operating parameter, by devices for each communication channel at the radiation element. The monitoring, or operating parameter, signals of the multiple communication channels are combined in a tower intelligent multiplexer at the radiation element, producing a data signal including values representing operating parameters of the multiple devices. Multiple communication signals received at the radiation element, for example, from mobile clients via a wireless link, are combined with the data signal. The combined multiple communication signals and data signal are transmitted to an intelligent multiplexer at the radio base station.

The combined multiple communication signals and data signal are received at the intelligent multiplexer of the radio base station. The data signal including values representing operating parameters of the multiple devices at the radiation element is extracted from the received signal. A status signal for each of the devices is produced from the data signal, simulating a feedback signal for the device. Thus, each communication channel receives a feedback signal corresponding to the monitoring signal measured at the radiation element.

Use of intelligent multiplexers may support many different types of monitoring techniques. For example, in one embodiment, a decision oriented alarm technique can be used where an operating parameter, such as current, of a device at the radiation element is measured, and a decision is made determining if the parameter is within its normal range. If the parameter is out of its normal range the tower intelligent multiplexer sends a signal to the base unit intelligent multiplexer indicating the parameter is out of its normal range. The base unit intelligent multiplexer indicates that the operating parameter is out of range to the corresponding communication channel, for example, by "crowbaring" the current up on the channel corresponding to the measured device.

In another embodiment, determining if the measured operating parameter is within its normal operating range is not done at the tower intelligent multiplexer. Instead, the tower intelligent multiplexer measures the operating parameter and sends a signal indicating the value of the operating parameter. The base unit intelligent multiplexer receives the value sent by the tower intelligent multiplexer and replicates, or "mirrors", the measured operating parameter on the corresponding channel. For example, the measured operating parameter may be a current, resulting in a "current mirror" or the measured value may be a voltage, resulting in a "voltage mirror." In another embodiment, the "current mirror" and "voltage mirror" may represent measurements made at the base unit intelligent multiplexer and "mirrored" to the tower intelligent multiplexer. For example, a voltage, or current, present on one or more of the communication channels received by the base unit intelligent multiplexers may be measured and the voltage, or current, signal may be "mirrored" at the tower intelligent multiplexer.

Intelligent multiplexers can also send command and control data from the base unit intelligent multiplexer to devices at the radiation element in a manner similar to the technique just described. For example, a command and control signal, or values representing operating parameter settings for devices at the radiation element, can be received at the base unit intelligent multiplexer. The command and control signal is converted to a data signal and combined with the multiple communication signals received at the base unit intelligent multiplexer from the communication channels. The combined multiple communication signals and the data signal are transmitted over a single feeder cable to the tower intelligent multiplexer at the radiation element.

The tower intelligent multiplexer receives the combined signal. The data signal, including the values representing operating parameter settings for devices at the radiation element, is extracted from the received signal. An output signal is produced that transfers the operating parameter settings to the device.

In FIG. 4 a radio base station 302 includes two communication channels 304 and 306, and two bias tees 310 and 312, as discussed in connection with FIG. 3. The outputs of the bias tees 310 and 312 are connected to a base unit intelligent multiplexer 360. The base unit intelligent multiplexer 360 combines the communication channel signals and monitoring signals into a signal that can be transmitted over a single feeder cable 364 to a tower intelligent multiplexer 368. Details of the base unit intelligent multiplexers 360 and tower intelligent multiplexer 368 are discussed below.

The tower intelligent multiplexer 368 separates the communication channel signals and the monitoring signals, and passes the signals to the corresponding support electronics 340 and 342 in radiation elements 330 and 332. The base unit intelligent multiplexer and tower intelligent multiplexer allow multiple communication channel signals and monitoring signals to be transmitted between the radio base station 302 and multiple radiation elements over a single feeder cable. Although FIG. 4 describes a communication system where two communication channels are combined and transmitted over a single feeder cable, other numbers of communication channels could be combined and transmitted over a single feeder cable. For example three (3), four (4), five (5), or any desired number of communication channels, and corresponding monitoring signals, may be combined and transmitted over a single feeder cable.

Figure 5:
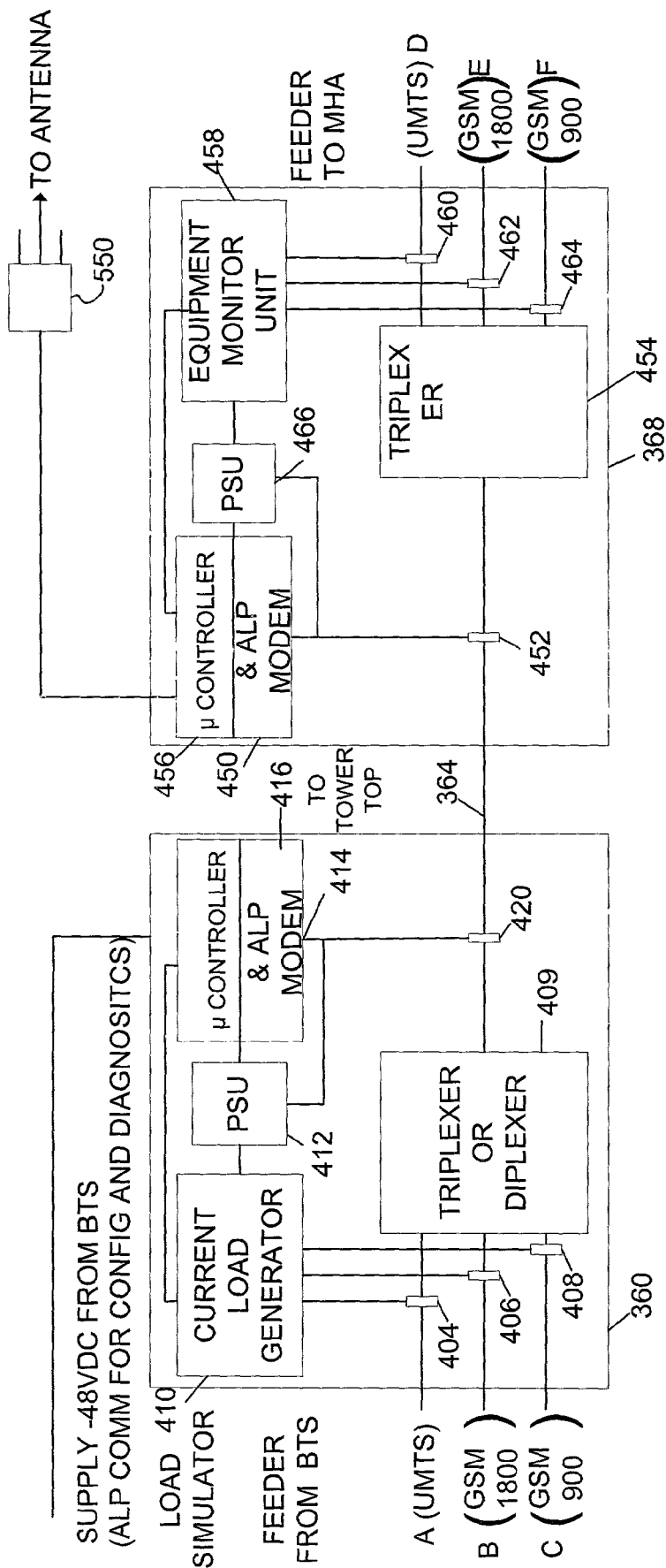
FIG. 5 is a block diagram of one embodiment of intelligent multiplexers in accordance with the invention.

FIG. 5 is a block diagram of one embodiment of intelligent multiplexers in accordance with the invention. The base unit intelligent multiplexer 360 receives communication channel signals from a plurality of communication channels. For example, in FIG. 4 the base unit intelligent multiplexer 360 receives three (3) communication channel signals combined with their corresponding monitoring signals: A a UMTS signal; B a GSM 1800 signal; and C a GSM 900 signal.

The three (3) communication channel signals, with their corresponding monitoring signals, are connected to a first port of the bias tees 404, 406, and 408 respectively. The bias tees 404, 406, and 408 each have three ports. A second port of each bias tee 404, 406, and 408 is connected to a multiplexer 409 where the three communication channel signals are combined. A third port of each bias tee 404, 406 and 408 is connected to a load simulator 410 where the monitor signals are routed. The load simulator 410 provides appropriate feedback to the monitor signals as discussed in detail below. The load simulator is also connected to a power supply unit 412 and a controller 414.

The base unit intelligent multiplexer 360 also includes a modem 416. The modem 416 provides bi-directional communication between the base unit intelligent multiplexer 360 and tower intelligent multiplexer 368. The modem 416 works in cooperation with a modem 450 in the tower intelligent multiplexer 368 to transfer data signals between the two multiplexers. The modem 416 receives a data signal from the controller 414 and outputs a modulated data signal to a bias tee 420. In the bias tee 420 the output of the multiplexer 409 and the output of the modem 416 are combined, and the combined signal is transmitted to the tower intelligent multiplexer 368.

The tower multiplexer 368 receives the transmitted signal from the base unit multiplexer 360 in a first port of a bias tee 452. The bias tee 452 has three ports. The second port is connected to multiplexer 454 where the three communication channel signals are separated. The third port of the bias tee 452 routes the modulated data signal to the modem 450. The modem 450 provides bi-directional communication of the data signal between the tower intelligent multiplexer 368 and base unit intelligent multiplexer 360. The modem demodulates the data signal transmitted by the modem 416 in the base unit intelligent multiplexer 360, and modulates a data signal received from the controller 456 in the tower intelligent multiplexer 368 for transmission to the base unit intelligent multiplexer 360. The controller 456 is also in communication with an equipment monitor unit 458.

The equipment monitor unit 458 connects to a port on each of the bias tees 460, 462, and 464. A second port of each of the bias tees 460, 462, and 464 is connected to the multiplexer 454. In the bias tees 460, 462, and 464 the output of the equipment monitor unit 458 and the corresponding communication channel signal from the multiplexer 454 are combined and transmitted to appropriate devices in a radiation element.

The equipment monitoring unit 458 monitors the operational state of devices at the radiation element. For example, the equipment monitoring unit 458 may monitor the current drawn from a power supply 466 and used to power a device at the radiation element, such as a MHA. The equipment monitoring unit 458 communicates a signal to the controller 456 indicating the value of the monitored signal for each device that is being monitored. The controller 456 formats the values and passes them to the modem 450 for transmission to the base unit intelligent multiplexer 360.

In the base unit intelligent multiplexer 360, the communication channel signals are combined and their corresponding monitor signals are routed to the load simulator 410. The controller 414 receives a transmission from tower intelligent multiplexer 368 and extracts the data signal from the input signal received from the tower intelligent multiplexer 368 that contains values indicating operating parameter settings for devices at the radiation element. The controller 414, in response to the values received, produces a status signal for each device and communicates this status signal to the load simulator 410. The load simulator, using the status signal, simulates a feedback signal for each device.

Thus, using intelligent multiplexers allows multiple communication channels to be combined and transmitted over a single feeder to a radiation element, while maintaining device monitoring capability. The actual operating parameters are measured at the tower intelligent multiplexer and a data signal that includes values representing the parameters is communicated to the base intelligent multiplexer 360. In the base unit intelligent multiplexer 360, a simulated load is applied to the actual monitoring signal of the communication channel to provide the appropriate feedback to equipment that is monitoring the channel. Using this technique allows adding communication channel equipment that normally requires a dedicated cable to be operated over a single feeder cable. Thus, upgrades to existing communication systems can be done without the expense of adding additional feeder cables.

For example, radio base stations usually provide the platform for a number of transmit/receive modules called transceivers. Each transceiver can support a number of simultaneous voice and data calls. The base station is usually arranged so that it services, transmits to and receives from, 3 sectors, each sector being 120 degrees, resulting in 360 degrees (3×120=360), and each sector will have typically one to four transceivers, each transceiver operating in the same frequency band.

The base station can have a number of antenna feeder arrangements but typically will have two antennas and associated feeds directed into each sector. The base station will receive on both antennas and transmit on one and/or both. Therefore the typical base station will have two (2) feeders for each of the three (3) sectors resulting in a total of six (6) feeders and six (6) MHAs. Each MHA is bi-directional, and typically only operates over a signal band. The MHA passes the transmit signals and amplifies the receive signals. A large percent of existing equipment is located on base stations as described above and there is no need for any additional equipment to be present.

A need for multiple control of antenna line equipment (i.e. MHAs) occurs when there is multiband transmission. Multiband transmission means that a base station is used as the platform for multiple transceivers, for example, two (2) or three (3) sets of transceivers of different frequency bands all transmitting into the same sector at the same time. To reduce cost and installation expense it is desirable to use a single feeder cable. Because feeder cables are generally wideband, they can pass all frequency bands. But, MHAs are band specific and the single feeder cable needs to be connected to multiple MHAs, for example, up to three (3) MHAs at the top of the tower with three (3) different bands. Multiplexers, or splitting and combining devices, are called triplexers when there are three bands and are called diplexers when there are two bands. Controlling and monitoring of the multiple MHAs through this common shared feeder cable may be accomplished as described above.

In another embodiment, the communication channel signals originate at a client and are received at the radiation element and transferred to the tower intelligent multiplexer. The intelligent multiplexer combines the communications channel signals and the data signal, as described above, and transmits the combined signal to the base intelligent multiplexer.

In yet another embodiment, the data signal can be used to transmit command and control signals from the base unit intelligent multiplexer to the tower intelligent multiplexer. The command and control signals can then be routed to the appropriate device at the radiation element. For example, in FIG. 5 a command and control signal can be transmitted from the base station intelligent multiplexer 360 to the tower intelligent multiplexer 368. As described above, the modem 450 demodulates the command and control signal transmitted by the modem 416 in the base unit intelligent multiplexer 360. The controller 456 in the tower intelligent multiplexer 368 routes the command and control signal to the appropriate radiation element D, E, or F via bias tees 460, 462, and 464 respectively, where the command and control signal may be used to control equipment at the radiation element. Alternatively, the radiation element may receive the command and control signal and transmit the signal, via an RF link, to other equipment. For example, the radiation element may communicate the command and control signal to other equipment located on the same tower that may, or may not, be connected to the multiplexer 454 in the tower intelligent multiplexer. Or, the radiation element may communicate the command and control signal to other equipment located in other locations, such as, equipment in proximity to the tower, or equipment at a second tower, or a radiation element at a second tower.

FIG. 5 also shows a universal antenna control interface 550. The universal antenna control interface 550 is in communication with the tower controller 456. The universal antenna control interface 550 is also in communication with equipment located at one or more radiation elements. The universal antenna control interface 550 may receive commands and control signals from the controller 456 and modify operating parameters, as well as monitor parameters, of equipment at a radiation element. For example, the universal antenna control interface may control and monitor the position of antenna tilt equipment, monitoring the voltage standing wave ratio (VSWR), and temperature of various pieces of equipment. Use of intelligent multiplexers supports the control and monitoring of equipment located at a radiation element over the same single feed cable that communication signals are transmitted.

The above embodiments described monitoring current draw of devices at the radiation element. In will be obvious to one of skill in the art that other parameters may be monitored, for example, VSWR performance, DC power reset counter, and temperature.

The foregoing description details certain embodiments of the invention. It will be appreciated, however, that no matter how detailed the foregoing appears, the invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

We claim:

1. A method of transmitting a communication signal between a radio base station and multiple radiation elements, the method comprising:
    a) receiving data signals from multiple radiation elements;
    b) generating a single modulated signal that combines data signals;
    c) producing a single input modulated signal, such that the input signal is adapted to be transmitted over a common feeder cable, wherein the data signals include values representing operating parameters of devices at the multiple radiation elements;
    d) transmitting the input modulated signal along with transmitted and received communication channel signals though the common feeder cable;
    e) receiving the input signal from the multiple radiation elements over the common feeder cable;
    f) extracting the data signals from the input signal; and
    g) producing a status signal for each device based upon the values representing operating parameters that simulates a feedback signal for the device.

2. A method as defined in claim 1, wherein the input signal comprises a plurality of communication signals.

3. A method as defined in claim 1, wherein the devices include system cables.

4. A method as defined in claim 1, wherein the devices include a mast head amplifier.

5. A method of transmitting a communication signal between a radio base station and multiple radiation elements, the method comprising:
    a) receiving data signals that include control signals representing operating parameter settings for devices at multiple radiation elements;
    b) generating a single modulated signal the combines data signals;
    c) producing single input modulated signal, to be transmitted over a common feeder cable;
    d) transmitting input modulated signal along with transmitted and received communication channel signals;
    (e) receiving the input signal over the common feeder cable;
    (f) extracting the data signals from the input signal; and
    (g) producing an output signal for each device that transfers the control signals representing operating parameter settings to the device.

6. A method as defined in claim 5, wherein the input signal comprises a plurality of communication signals.

7. A method as defined in claim 5, wherein the devices include a mast head amplifier.

8. An apparatus for transmitting a communication signal between a radio base station and multiple radiation elements, the apparatus comprising:
    a bias tee configured to receive an input signal from the multiple radiation elements over a common feeder cable, wherein the input signal comprises data signals that are received from multiple radiation elements and are combined into a single modulated signal for transmission over the common feeder cable, the data signals including values representing operating parameters of devices at the multiple radiation elements;
    a controller configured to extract the data signals from the input signal and to produce a status signal based upon the values representing operating parameters for the devices; and
    a load simulator that simulates a feedback signal for the devices in accordance with the status signal.

9. An apparatus for transmitting a communication signal between a radio base station and multiple radiation elements, the apparatus comprising:
    a bias tee configured to receive an input signal over a common cable, wherein the input signal comprises a single modulated signal that is a combination of data signals that include control signals representing operating parameter settings for devices at multiple radiation elements; and
    a controller configured to extract the data signals and to produce an output signal for each device that transfers the control signals representing operating parameter settings to the device.

* * * * *